April 6, 1965 J. R. ASHLEY 3,177,431

PREDISTORTING MODULATING CIRCUIT FOR PULSE GENERATOR

Filed July 3, 1962 2 Sheets-Sheet 1

INVENTOR.
JAMES R. ASHLEY
BY
John H. Gallagher
ATTORNEY

PREDISTORTING MODULATING CIRCUIT FOR PULSE GENERATOR

Filed July 3, 1962 2 Sheets-Sheet 2

INVENTOR.
JAMES R. ASHLEY
BY
John H. Gallagher
ATTORNEY

United States Patent Office 3,177,431
Patented Apr. 6, 1965

3,177,431
PREDISTORTING MODULATING CIRCUIT FOR PULSE GENERATOR

James R. Ashley, Gainesville, Fla., assignor to Sperry Rand Corporation, Great Neck, N.Y., a corporation of Delaware Filed July 3, 1962, Ser. No. 207,182
9 Claims. (Cl. 325—141)

Figure 1A:
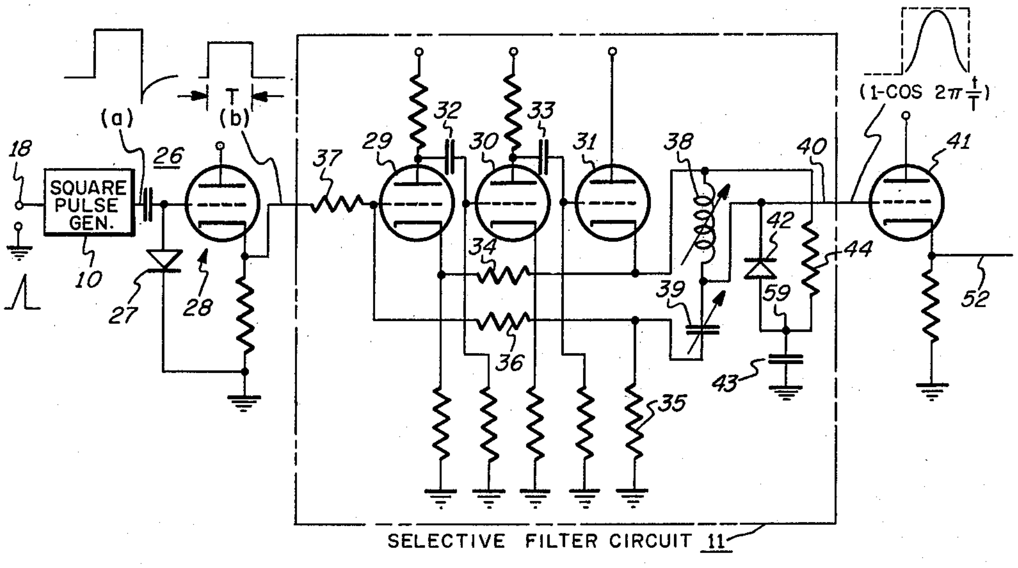

This invention relates to microwave modulators and more particularly it concerns a pulsing means for generating specially shaped bursts of microwave energy.

As the use of radio frequency equipment increases, and as the range of frequencies employed is extended, the problem of interference between independent systems becomes more acute. Although two independent radio systems may operate on carrier frequencies which are widely displaced in the frequency spectrum, the manner of modulation of the carrier wave of one system may cause generation of sideband signals which fall within the frequency range of the other, thus causing interference. In radar systems, for example, where the most efficient type of modulation from a power consideration is that which produces sharply rising, substantially rectangularly shaped bursts of microwave energy, such an extreme range of sideband signals is generated that nearly all other radio frequency equipment in the vicinity may be subjected to interference regardless of their frequencies of operation.

It has been found that the most acceptable compromise between the considerations of efficiency and the generation of a minimum number of interfering frequency components in communication, navigation and radar systems is a modulating pulse which produces a substantially Gaussian shaped amplitude distribution in each microwave burst. In the past, a number of techniques have been developed for the production of modulating pulses of this shape. These include the gating and biasing of a continuous sine wave to somewhat approximate a Gaussian shaped pulse. Other systems supply a triangularly shaped voltage wave to a microwave generator having a transfer characteristic which will properly reshape the wave. Still other techniques involve the generation of a signal which contains a wide range of frequency components, including those which make up a Gaussian shaped wave, and then by means of a passive filter, only the desired frequency components are passed to produce the Gaussian shaped pulse. The pulse then is directedly applied to the microwave tube to produce a high power microwave pulse.

While each of the techniques mentioned has been found useful to reduce the frequency content of the microwave pulse, all suffer from the fact that they are not controllable and hence the final output remains dependent, to a great extent, on the individual characteristics of the particular microwave tube with which they are used. This is undesirable because different microwave tubes of a given type do not always have identical transfer characteristics due to the inherent inability to exactly control the construction and assembly of the tubes and their component parts. Therefore, in the known prior art, each pulsing circuit had to be specifically constructed and adjusted to achieve optimum operation with a given tube, and upon replacement of the tube with one of the same type, and even more so with tubes of different types, the pulsing circuit and tube would not produce optimum intended operation. The first and third above-mentioned techniques also are subject to problems of producing asymmetrical pulse shapes since in both oscillators and in passive filter systems the inherent resistance in the circuits produce a different effect upon the leading edge than upon the trailing edge of each pulse. An asymmetrically shaped pulse is undesirable because its frequency content is greater than that of a symmetrical pulse. Any attempt to compensate for this usually adversely affects pulse width and time of occurrence. The primary disadvantage of the second technique is its dependence upon the quality of the input signal. This technique further suffers from the feature that the discontinuity at the apex of the triangularly shaped input wave may cause the generation of undesired sideband energy.

It is an object of this invention, therefore, to provide an improved microwave modulating system.

It is a further object to provide such a system which is accurate and adjustable.

Another object is to provide such a system wherein symmetric modulating pulses of a desired shape and determinable time of occurrence and duration may be produced.

Another object is to produce a modulating signal having no discontinuities.

A further object is to produce a modulating signal which compensates for the nonlinear transfer characteristic of a microwave pulse generator so that the microwave pulse generator produces output pulses having Gaussian shaped envelopes.

A still further object of the invention is to provide a precise modulating wave shape which is substantially independent of the quality of an input signal to the modulator.

Another object of the present invention is to provide a pulse modulating system wherein the shape, duration and time of occurrences of the pulses is very closely controlled, and wherein the amplitude characteristics of the controlled pulses may be easily varied in a manner to compensate for the nonlinear transfer characteristics of a pulse generator or amplifier to be modulated by said pulses.

Briefly, these objects are accomplished through the synthesis of a modulating pulse in the following manner. Means are provided to generate an initial rectangular waveform which establishes pulse duration and time of occurrence. This waveform is passed through a frequency selective filter which attenuates certain frequency components contained in the original wave. By means of this selective attenuation the frequency filter converts the original rectangular waveform to a smoothly rounded one having the continuity and symmetry of a Gaussian amplitude distribution while preserving the previously established properties of pulse duration and time of occurrence. This waveform is then applied to an amplitude responsive, amplitude modifying means, wherein pulse shape is converted to that necessary to compensate for the nonlinearity in the transfer characteristics of a microwave tube, for example, so that the output pulse from the tube will be substantially the same as the previously generated Gaussian pulse having the desired continuity and symmetry, this being the desired pulse shape that has a relatively narrow frequency spectrum. The amplitude responsive means operates instantaneously and independently of frequency and thus preserves the previously supplied characteristics of time of occurrence, duration, continuity and symmetry. The symmetry of the modulating pulse depends upon the absence of resistive impedance in the frequency filter. In order to eliminate resistive effects, a special negative impedance amplifier is provided in a manner to be described.

Figure 2:
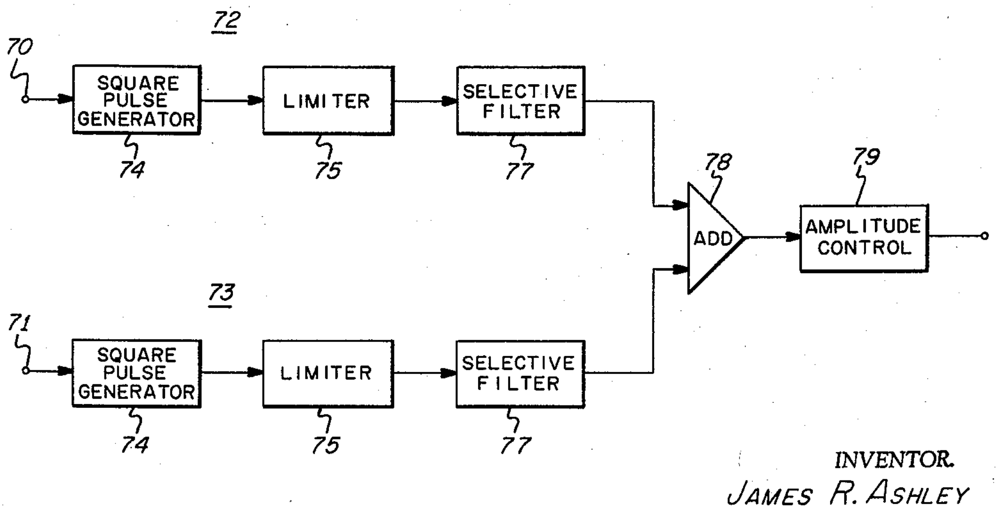
Figure 1B:
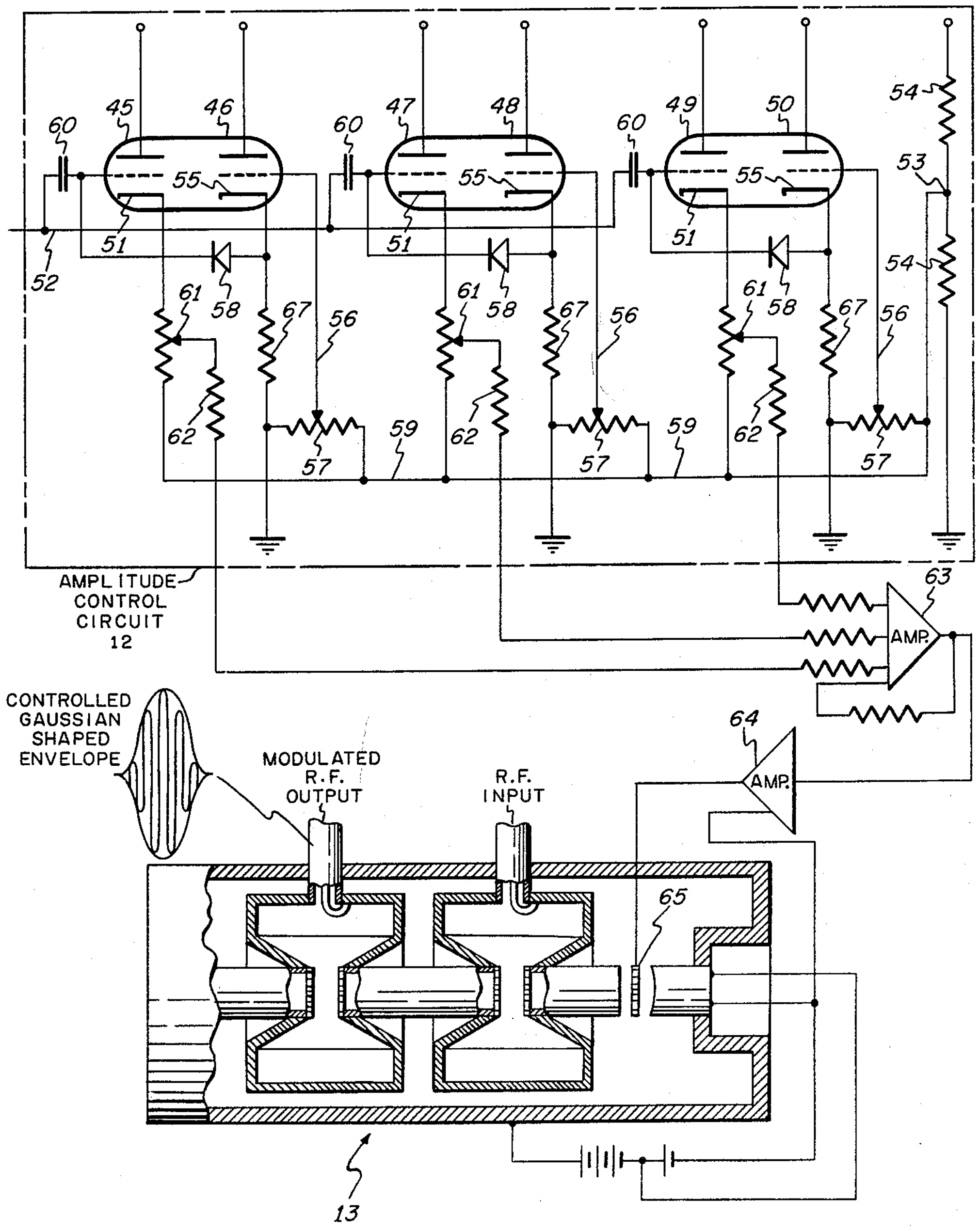

Referring now to the drawings:

FIGS. 1*a* and 1*b* together comprise a schematic circuit diagram showing a preferred embodiment of the invention and further showing waveforms at the outputs of various component circuits, and;

FIG. 2 is a block diagram of another embodiment of the present invention.

The embodiment of FIG. 1 is seen to comprise a square pulse generator 10, a selective filter circuit 11, an amplitude or shape control circuit 12, and a microwave amplifier, such as a klystron tube 13. The square pulse generator 10 may be a monostable type multivibrator which produces a substantially rectangularly shaped voltage output pulse in response to each one of a train of input trigger pulses applied at an input terminal 18. If desired, square pulse generator 10 may be provided with means for varying the width and time of occurrence of the output pulses therefrom. The output voltage from square pulse generator 10 is applied to a limiting and matching circuit 26. This limiting and matching circuit includes a limiter diode 27 connected in the forward direction from the output of the square pulse generator 10 to ground. The purpose of the limiter diode is to clamp the top of the pulse at ground potential to insure that it has a flat top. Limiting of the bottom corners of the rectangular pulse is accomplished by maintaining cathode follower 28 in the cut off condition in the absence of a pulse applied to its grid.

The selective filter circuit 11 is comprised of a reactive portion driven by a negative impedance amplifier portion. The amplifier portion includes three triodes 29, 30 and 31 each having its anode connected to a source of positive potential (not shown). The anodes of the first two triodes 29 and 30 are each connected via respective capacitors 32 and 33 to the grids of their next succeeding triode. These grids also are resistively connected to ground. The reactive portion of the selective filter circuit comprises a variable inductor 38 and a variable capacitor 39 connected in series with the cathode of the cathode follower tube 31. The negative impedance aspect of the amplifier portion is achieved through a dual feedback arrangement. A negative voltage feedback is provided by means of a resistor 34 connected between the cathodes of the third triode 31 and the first triode 29. A positive current feedback arrangement includes a resistor 35 connected in the cathode follower output of the third triode 31 and arranged to receive all current supplied via this triode to the reactive portion of the circuit. Resistor 36 is connected between the positive side of the first resistor 35 and the grid of the first triode 29 and completes the positive current feedback loop. Output signals from the reactive portion are taken between the inductor 38 and capacitor 39 via an output lead 40 to an impedance matching cathode follower circuit 41 which matches the output impedance of the filter circuit 11 to the input of the amplitude control circuit 12. A clipping diode 42 is connected in the forward direction from a point between capacitor 43 and a resistor 44 to the output lead 40. The capacitor 43 and resistor 44 are connected in series between ground and the cathode of the third triode 31 in the negative impedance amplifier portion. The purpose of the resistor 44 and capacitor 43 is to establish a potential on the anode terminal of diode 42 which is very close to the desired baseline potential of the pulse waveform seen at the junction of inductor 38 and capacitor 39. If the waveform at the junction attempts to go negative with respect to the baseline, the diode will conduct and limit the undesired undershoot.

The amplitude control circuit 12 may be seen to comprise a number of triodes 45, 46, 47, 48, 49 and 50 arranged in pairs and each having its anode connected to a common source of positive potential (not shown).

Although the present embodiment utilizes only three pairs of triodes, it will be apparent to one skilled in the art that the system may be extended to incorporate any number of triodes depending upon the fineness of control desired. Input signals are supplied to the amplitude control circuit 12 from the output of the cathode follower circuit 41 along a common line 52 and are coupled through respective capacitors 60 to the grid of the first triode of each pair. The first triode in each pair has a cathode 51 which is resistively connected to a common cathode line 59. Common cathode line 59 is maintained at a fixed positive potential by means of a connection 53 to a voltage divider circuit 54. The second triode in each pair has a cathode 55 which is connected to ground through resistor 67. Each second triode is maintained at a preselected degree of conduction by means of a connection from its grid to the movable tap 56 of potentiometer 57 which is connected between ground and the common cathode line 59. The voltage at the cathode 55 of the second triode of each pair is supplied via a diode 58 to the grid of the first triode in its respective pair to bias the first triode below its point of conduction by an amount dependent upon the output voltage of the cathode follower triode 46. Adjustable output taps 61 along the resistively connected cathode circuits of the first triode of each pair supply voltages from these points through associated resistances 62 and these voltages are summed at a feedback summing amplifier 63. The output signal from the summing amplifier 63 is coupled via an isolation amplifier 64 to the control electrode 65 of the klystron amplifier 13. It is to be understood that other types of power pulse generators other than a klystron may be modulated in accordance with the present invention.

Operation of the system now will be discussed. As has been stated, a modulating pulse is synthesized in such a manner that the application of certain desired amplitude characteristics at one point in the circuit will not degrade other characteristics which were previously supplied at another point. During operation, trigger voltage signals are applied to the input terminal 18 of the square wave generator 10 at times commensurate with the beginning of each desired microwave burst. Square pulse generator 10 operates in response to the input trigger signals to produce substantially rectangularly shaped pulses as illustrated by the waveform appearing adjacent the output thereof. Because of the regenerative characteristics of the square pulse generator 10, the trailing edge of the output pulse generally experiences a certain degree of negative overshoot as can be seen in the illustrated waveform. The negative overshoot is limited by triode 28, and the top of the pulse is clipped by diode 27 so that the resulting output voltage waveform is as illustrated at the output of cathode follower 28. A Fourier analysis of this voltage signal reveals that it is composed of a great number of frequency components. By proper attenuation of certain of these components a voltage wave may be produced which has smoothly and monotonically varying leading and trailing edges that are symmetrical about its midpoint, that is, a shape that approximates the Gaussian shape. It is this frequency selective attenuation which is to be performed in the filter circuit 11.

The square wave output from cathode follower 28 is coupled into the filter circuit 11 through input resistor 37 and is amplified in the three stage amplifier portion of the circuit composed of triodes 29, 30 and 31, and then is applied to the inductor 38 and the capacitor 39 which comprise the reactive portion of the circuit. The values of inductor 38 and capacitor 39 are adjusted to have a natural oscillatory period equal to the duration (T) of the square wave signal. This results in a filter characteristic such that only those frequency components of the square pulse are passed which produce a voltage waveform which varies according to the function $(1-\cos 2\pi t/T)$, where $t/T$ is the fraction of the period which has transpired at any instant. This waveform has an amplitude characteristic substantially that of the desired Gaussian distribution. This particular filter configuration, in combination with a square wave input signal, has been found most desirable from the standpoint of simplicity, accuracy, and adaptability for use with different tubes.

The filtering action of inductor 38 and capacitor 39 involves a transfer of energy between them and a certain amount of energy is lost over the duration of the modulating pulse as a result of this current being attenuated by the inherent resistances associated with these elements. The resistance in the reactive portion of the circuit causes the reactive portion of the circuit to respond differently to the leading and trailing edges of the square input waveform, and this would lead to the generation of an asymmetrical output pulse from the filter circuit. This would increase the frequency spectrum of the output pulse from the microwave generator and is to be avoided. This undesirable resistive component in the reactive portion of the circuit is compensated for by the positive current feedback from the top of resistor 35 in the cathode circuit of triode 31, through resistor 36 to the grid of the amplifier 29. This feedback is so proportioned with respect to the characteristics of the filter circuit so as to make the impedance of the amplifier portion sufficiently negative to cancel the positive resistance of the reactive portion of the circuit, and thus substantially eliminate the effect of resistance from the filter circuit and permit the generation of a highly symmetrical waveform having a nearly Gaussian shape. The negative voltage feedback to the cathode of triode 29 from the cathode circuit of tube 31 improves the stability of the active filter circuit and reduces its output impedance. The ratio of feedback to input signal may be adjusted by controlling the ratio of the values of the input resistor 37 and the output resistor 36.

It may be seen that while the characteristics of symmetry and smoothness or continuity have thus been added to the original input pulse, the previously applied characteristics of time of occurrence and pulse duration have been preserved. As previously mentioned, in order for the duration of the Gaussian shaped pulse to have the same time duration (T) as the square wave input pulse, the quantity $2\pi\sqrt{LC}$ of the reactive portion of the circuit must be proportioned to equal the value of (T), the duration of the square pulse. If this is not the case, a certain amount of "ringing" or subsidiary oscillation will occur at the output of the selective filter circuit at the end of each pulse. To a certain extent this may be eliminated by means of the diode 42 in conjunction with the capacitor 43 and resistor 44. The diode prevents output voltages from going below a reference potential established between the resistor and the capacitor when the trailing edge of the square shaped voltage pulse occurs. This ensures a smooth and gradual descent precisely to ground potential at the end of each input pulse, thus substantially insuring a Gaussian waveform.

The smooth and symmetrical output voltage pulse on line 40 is applied via the cathode follower 41 to the amplitude control or shaping circuit 12 where it is shaped to compensate for the particular nonlinear transfer characteristic of the microwave amplifier 13. That is, because the transfer characteristic of the microwave generator is nonlinear it will introduce amplitude distortion in the envelope of its output pulse. The function of amplitude control circuit 12 is to distort the amplitude only of the Gaussian pulse from filter 11 in a manner opposite to that introduced by the microwave amplifier 13 so that the resultant envelope of the microwave pulse again has substantially a Gaussian amplitude distribution. The amplitude control performed on the pulse by amplitude control circuit 12 is a function only of the amplitude of the input Gaussian shaped pulse so that it does not affect the time of occurrence or duration of the output pulse. In the amplitude control circuit, the first triode of each pair of triodes is maintained at a different level below "cutoff" by means of a bias voltage between its grid and cathode, this bias voltage being established by the voltage drop acros the cathode resistor 67 asociated with the second triode of its respective triode pair. Signals from the selective filter circuit 11 are capacitively coupled on common line 52 to the grids of triodes 45, 47 and 49, causing the triode biased closest to its cutoff point to conduct first, followed by the others in sequence as the magnitude of the voltage pulse increases. As each one of triodes 45, 47 and 49 conducts it causes a respective voltage to appear at its cathode resistor tap 61. The voltages at the cathode resistor taps 61 of the triodes are connected to summing amplifier 59 which operates in response thereto to produce a reshaped pulse having amplitude distortion opposite to that to be produced by microwave amplifier 13. It can be seen that by proper selection of the grid voltages and the cathode voltages of triodes 45, 47 and 49, reshaping of the input pulse to amplitude control circuit 12 may be effected without affecting its previously supplied characteristics of time of occurrence, continuously, symmetry, and duration.

It is to be noted that the amplitude or shape control circuit 12 utilizes triodes rather than diodes which are generally used in function generators. The purpose of this is to eliminate the inherent capacitive coupling that would occur between the input and output of the diodes which were not conductive. This capacitive coupling, being reactive, actually differentiates the input signal and thus causes an asymmetrical condition at the output. Since there is less capacitance between the grid and cathode of a triode, and since the triode can operate with a lower value of load resistance, the high frequency and pulse capabilities of the circuit are greatly increased.

The output voltage pulse from the summing amplifier 63 is supplied to the grid 65 of the microwave amplifier 13 via power amplifier 64, and microwave amplifier 13 responds thereto to produce the desired output pulse.

It thus is seen that the symmetrical waveform of Gaussian type shape having fixed duration and time of occurrence first is generated, and then this waveform is distorted in amplitude in an opposite manner from that which will be introduced by a microwave pulse generator, or amplifier, so that the resultant pulse from the microwave device has substantially the desired Gaussian shaped envelope. This is believed to be the most versatile and useful pulse modulating circuit for use with microwave tubes that must produce a high power pulse of narow frequency spectrum. Its versatility arises from the fact that the ultimately-desired type of symmetrical waveform first is established by the filter circuit, and then this waveform is varied in amplitude only to compensate for the nonlinear characteristics of the microwave tube. The amplitude variation means being adjustable makes the modulating circuit compatible with a great many different types of tubes, rather than just one, as is characteristic of some known pulse modulating circuits.

The approach followed in the present invention is much more desirable than attempting to directly generate a modulating pulse having amplitude characteristics that compensate those introduced by the microwave tube. In this latter case, major redesign effort often is required in order to make the circuit compatible with a different tube of the same type or with a tube of a different type. This is caused by the fact that in the direct-design approach any attempt to vary the amplitude pattern of the pulse often adversely affects symmetry, duration, or time of occurrence.

For certain applications, such as in navigation or signaling systems, it becomes necessary to produce a succession of transmitted pulses spaced by precisely controlled time intervals. The block diagram of FIG. 2 shows a system for producing a pair of such pulses in accordance with the teaching of the present invention. Here trigger pulses are applied to separate input terminals 70, 71 of individual signal processing channels 72, 73. Each channel includes its own square shaped pulse generator 74, limiting and matching circuit 75 and selective filter circuit 77. The output pulses from each of the selective filter circuits are supplied to an addition circuit 78 which excites a common signal amplitude control circuit 79. The signal amplitude control circuit and the individual elements in each channel operate in the manner of their counterparts in FIG. 1. With the system of FIG. 2, however, it is possible to generate very closely spaced pulses without danger of their mutual interaction and consequent distortion. Furthermore, the pulses may be easily and simultaneously controlled in shape by adjustment of the single amplitude control circuit.

While the invention has been described in its preferred embodiment, the words which have been used are words of description rather than limitation and that changes within the purview of the appended claims may be made without departing from the true scope and spirit of the invention in its broader aspects.

What is claimed is:

1. A microwave modulating system comprising
means for generating a pulse signal having a duration and time of occurrence coinciding with that of a desired microwave pulse,
said pulse signal including frequency components whose sum represents a symmetrical and continuous waveform that varies monotonically from zero to maximum amplitude during the first half of said period and returns to zero in a monotonic manner during the second half of said period,
a frequency selective attenuator means adapted to extract said frequency components from said pulse signal thereby to produce said symmetrical waveform,
a plurality of electron tubes each having a respective grid circuit adapted to produce conduction of the tube upon application of a respective value of voltage,
means for applying said symmetrical waveform to each grid circuit,
a resistor associated with each electron tube and connected to pass all the current flowing through its associated tube,
means for summing voltages which occur at a positionable point on each resistor,
and means for applying summed voltages from said voltage summing means to the control electrode of a microwave amplifying means.

2. The combination claimed in claim 1 wherein said frequency selective attenuator means comprises
a regenerative feedback amplifier and a reactive circuit comprised of an inductor and a capacitor coupled to the output of said amplifier,
the values of said inductor and capacitor being proportioned so that said reactive portion has a natural oscillatory period substantially equal to the duration of said pulse signals,
said amplifier having a regenerative feedback signal proportional to current flow through the reactive portion of said attenuating means.

3. Means for producing from a device that has a nonlinear transfer characteristic a symmetrically shaped pulse of energy having a relatively narrow width and smoothly varying amplitude distribution, said means comprising,
means for producing a rectangularly shaped pulse waveform of fixed duration and time of occurrence,
frequency selective pulse modifying means operable in response to said rectangularly shaped pulse to produce a pulse waveform of said fixed duration and time of occurrence and having said relatively narrow width and smoothly varying amplitude distribution,
a plurality of current conduction devices each having control electrodes coupled to said pulse modifying means,
various ones of said current conduction devices being adapted to conduct current at different amplitudes of the output pulse from said pulse modifying means, and
a summing amplifier coupled to receive the output signals from all of said current conduction devices and operable in response thereto to produce a symmetrical pulse whose shape is different from the shape of the output pulse from said pulse modifying means.

4. The combination claimed in claim 3 wherein said pulse modifying means includes a reactive portion and a negative impedance portion,
said reactive portion having a certain value of resistance associated therewith, and the impedance of said negative impedance portion being proportioned to substantially cancel the resistance of said reactive portion.

5. The combination claimed in claim 4 wherein
the reactive portion of said pulse modifying means includes inductive and capacitive means,
said inductive and capacitive means being proportioned to have a natural oscillatory period substantially equal to the duration of said rectangularly shaped pulse.

6. A modulating system for use with a signal handling device having a nonlinear transfer characteristic comprising,
means for generating a pulse signal,
said pulse signal including frequency components whose sum represents a symmetrical and continuous waveform that varies smoothly from zero to maximum amplitude during the first half of its period and returns to zero in a smoothly varying manner during the second half of said period,
a frequency selective attenuator means adapted to extract said frequency components from said pulse signal thereby to produce said symmetrical waveform,
a plurality of signal responsive devices coupled to receive said symmetrical waveform and operable at respective different amplitudes of said waveform to produce respective output signals in response to the portion of said symmetrical waveform that exceeds the respective different amplitudes,
and means for summing the respective output signals of said signal responsive devices to produce a composite waveform,
the output signals of said signal responsive device being proportioned to produce a summed composite waveform which when operated upon by said nonlinear transfer device produces a signal having an amplitude characteristic corresponding to that of said symmetrical waveform.

7. A modulating system for use with a nonlinear transfer device comprising,
means for producing a first signal,
said first signal including frequency components whose sum comprises a second signal that is different from said first signal,
means for extracting said frequency components from said first signal thereby to produce said second signal,
a plurality of signal responsive devices coupled to receive said second signal and operable at respective different amplitudes of said second signal to produce respective output signals in response to the portion of said second signal that exceeds the respective different amplitudes, and
means for summing the output signals of said signal responsive device to produce a composite signal.

8. The combination claimed in claim 7 and further including,
means associated with said signal responsive devices for varying the respective different amplitudes at which the signal responsive devices become operable in response to said second signal.

9. A modulating system for use with a nonlinear transfer device comprising,
a plurality of signal means each adapted to generate a respective first signal,
each of said first signals including frequency components whose sum represents a second signal different from said first signal, a frequency selective attenuator means respectively associated with each one of said plurality of signal means to extract said frequency components from the respective first signal applied thereto, thereby producing respective second signals, a plurality of signal responsive devices each coupled to receive the second signal from said frequency selective attenuator means and each operable at a respective amplitude of its input second signal to produce an output signal in response to the portion of the input second signal that exceeds said respective amplitude, and means for summing the output signals from said plurality of signal responsive devices.

References Cited in the file of this patent

UNITED STATES PATENTS

| | | |
|---|---|---|
| 1,779,380 | Dudley | Oct. 21, 1930 |
| 2,199,192 | Artzt | Apr. 30, 1940 |
| 2,890,420 | Bradburd | June 9, 1959 |
| 3,098,980 | Dodington | July 23, 1963 |